3,375,285
CATALYTIC HYDROGENATION OF POLYCYCLIC AROMATIC QUINONES
Perry A. Argabright, Littleton, Colo., assignor to Marathon Oil Company, Findlay, Ohio, a corporation of Ohio
No Drawing. Filed Dec. 12, 1963, Ser. No. 330,000
14 Claims. (Cl. 260—618)

This invention relates to the preparation of polycyclic alcohols from quinones and more particularly to the catalytic hydrogenation of polycyclic aromatic quinones to form alicyclic alcohols.

Quinones have been hydrogenated previously. Thus, Skita et al., Ber. 63B, p. 1473 (1930) and Cardani, Gazz. chim. ital. 82, p. 155 (1952) hydrogenated 1,4-naphthoquinone using, respectively, colloidal platinum and Raney nickel. 5,6,7,8-tetrahydro-1,4-naphthahydroquinone was the product of these hydrogenations. Papa et al., J. Org. Chem. 14, p. 366 (1949) formed the 1,4-napthohydroquinone by noncatalytically reducing 1,4-naphthoquinone. In another noncatalytic reduction, Boyland et al., J. Chem. Soc., p. 1837 (1951) reduced 2-methyl-1,4-naphthoquinone with LiAlH$_4$ to form a product having a melting point similar to a cis-1,4-dihydroxy-2-methyl-1,2,3,4-tetrahydronaphthalene. Chemical reduction utilizing reagents, such as stannous chloride-HCl; Sn-HCl; phenylhydrazine; Na$_2$S$_2$O$_4$; and triphenylmethyl magnesium chloride, also yield 1,4-naphthohydroquinone.

I have now discovered that polycyclic aromatic quinones can be hydrogenated to form mono- and polyhydric alcohols by hydrogenating the quinones in the presence of copper chromite. The mechanism of this process differs from the mechanism of the prior art processes inasmuch as a hydroquinone does not appear to be an intermediate in the process.

Aryl alicyclic mono- and polyhydric alcohols are formed by the process of this invention. These alcohols are prepared from polycyclic aromatic-p-quinones wherein at least one quinoid structure is terminal, i.e., is external to the polycyclic series. For example, a 1,4-anthraquinone is a useful raw material in my process, while its 5,10-isomer is not. In typical reactions, 1,4-naphthoquinone is hydrogenated to 1,2,3,4-tetrahydro-1-naphthol or the 1,2,3,4-tetrahydro-1,4-naphthalene diol. Other suitable quinones include 2-hydroxy-1,4-naphthoquinone;
2-methyl-1,4-naphthoquinone;
2-ethyl-1,4-naphthoquinone;
2,3-dichloro-1,4-naphthoquinone;
2,3-dibromo-1,4-naphthoquinone;
2-amino-1,4-naphthoquinone;
2-anilino-1,4-naphthoquinone;
2,3-dianilino-1,4-naphthoquinone;
3-chloro-2-piperidino-1,4-naphthoquinone;
5-hydroxy-1,4-naphthoquinone;
2-hydroxy-3-(3-methyl-2-butenyl)-1,4-naphthoquinone;
2-hydroxy-3-isoamyl-1,4-naphthoquinone;
2-hydroxy-3-phenyl-1,4-naphthoquinone;
5-hydroxy-2-methyl-1,4-naphthoquinone;
2,3,6-tribromo-5-hydroxy-1,4-naphthoquinone;
3-dihydroxy-1,4-naphthoquinone;
5,8-dihydroxy-1,4-naphthoquinone; and
2,5,8-trihydroxy-1,4-naphthoquinone.

From the above, it is evident that both the quinoid ring and the aromatic rings can be substituted with a variety of moieties. It should be noted, however, that substituents on the quinoid ring should have a molecular diameter sufficiently small to enable the raw material quinone to interact with the catalytic substrate. Thus, methyl or phenyl substituents on the quinoid ring do not prevent the interaction of the ring with the substrate whereas a t-butyl substituent substantially inhibits the catalytic reaction. The reactivity of a particular substituted quinone can be determined readily by a trial hydrogenation.

Copper chromite utilized in the process of this invention can be solid in form or deposited on a nonacidic material, such as silica, according to known techniques. Normally, only from about 5.0 to about 21.4 grams of catalyst per gram mole of quinone is required, though 10–30 grams per gram mole are preferred. More or less catalyst can be utilized as desired.

Generally, the reaction is carried out in the presence of a solvent which is inert to the reaction under the reaction conditions. These solvents include the alkanes, alkane alcohols, etc. Normally from about 500 to about 2,000 volumes of solvent per mole of quinone is sufficient for solution of the quinone. The amount of a particular quinone soluble in a particular solvent can be determined readily by routine methods.

The reaction is carried out at temperatures from about 125 to about 200° C. and preferably from about 135 to about 175° C. for a period of time ranging from about 1 to about 8 hours and preferably from about 2 to about 6 hours. Hydrogen pressures in excess of about 500 p.s.i.g. can be utilized, though pressures of about 3,000 to about 5,000 p.s.i.g. are preferred.

The product obtained varies with the temperature utilized in carrying out the reaction. Thus, where 2-methyl-1,4-naphthoquinone is hydrogenated at 125° C., 2 isomeric 2 - methyl - 1,4 - dihydroxy-1,2,3,4-tetrahydronaphthalenes are obtained; at temperatures of 150° C., a mixture of e,e,e-2-methyl-1,4-dihydroxy-1,2,3,4-tetrahydronaphthalene was obtained together with trans-1-hydroxy-2-methyl-1,2,3,4-tetrahydronaphthalene and 1-hydroxy - 3 - methyl-1,2,3,4-tetrahydronaphthalene; while at 175° C. only the latter mentioned alcohols were obtained. Thus, we can see that the process can be adapted to the preparation of alcohols (tetralols) or glycols depending on the reaction temperature.

The following examples more fully illustrate my invention; however, it is not intended that the invention be limited to the raw materials, products, etc., disclosed. Rather, it is intended that all equivalents obvious to those skilled in the art be included within the scope of my invention as claimed.

*Example I*

A 15.8-grams portion of 1,4-naphthoquinone (0.100 mole) was dissolved in 150 ml. of absolute ethanol. Copper chromite (2.14 grams) was added to the solution, and the mixture placed in a nitrogen-filled rocking bomb. The reaction mixture was heated at 150° C. for 4 hours in the presence of 2,990–3,000 p.s.i. hydrogen. At the end of the 4-hour period, the bomb was vented and the copper chromite filtered from the reaction mixture. The filtrate was distilled at atmospheric pressure under nitrogen. After removal of 75% of the ethanol, an equal volume of ether was added which precipitated an off-white solid. The solid was removed and triturated with ether to yield 8.6 grams of 1,4-dihydroxy-1,2,3,4-tetrahydronaphthalene having a melting point of 137.8–138.0° C. The remaining solution was vacuum distilled to recover a trace of 1,2,3,4-tetrahydronaphthalenes and 0.8 gram of a mixture of the naphthalene diol, quinone, and naphthohydraquinone. The following data show this material to be the trans isomer.

*Infrared.*—The spectrum (KBr pellet) shows a strong broad absorption band at 3.05μ, typical of a hydrogen-bonded OH. In dilute chloroform solution this band is shifted to 2.80μ of low intensity and sharp. This behavior is typical of a hydroxyl group involved in polymeric

*intermolecular* hydrogen bonding. If the association were *intramolecular*, the intensity, shape, and position of the band would be dilution independent. This observation would argue against a boat conformation for the alicyclic ring bearing the hydroxyl groups as represented by V. Such a bridged structure could exist only if the hydroxyl groups are in the cis configuration. The spectrum also shows

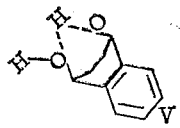

strong absorption bands at 9.60μ, indicative of a hydroxyl group on a cyclohexane ring, and at 13.16μ, typical of an ortho-disubstituted aromatic ring.

*Ultraviolet.*—The ultraviolet spectrum (in 95% ethanol) showed a cluster of three peaks whose location (λ) and molar extinction coefficients (ε) compared favorably with those of o-xylene, a logical model for II.

| $\lambda_{max}$, mμ | log ε | |
|---|---|---|
| | II | o-Xylene |
| 261-3 | 2.44 | 2.42 |
| 266-7 | 2.36 | 2.35 |
| 271 | 2.25 | 2.33 |

These data support a structure wherein the hydroxyl groups are on the saturated ring (I) rather than on the aromatic ring (III).

*Nuclear magnetic resonance.*—An NMR analysis of the product proved definitively that hydrogenation took place solely in the oxygenated ring. The spectrum was run in dimethylsulfoxide due to the low solubility of the product in conventional solvents. As shown in the following table, the integrated intensities of the OH and Hα to OH protons are equal, which would not be the case if the OH groups were on the aromatic ring.

| Line or Group | T | Relative Intensity | H Assignment |
|---|---|---|---|
| Complex Multiplet | 2.71 | 9 | Aromatic. |
| Sharp Line | 4.91 | 4.5 | Hydroxyl. |
| Broad Triplet | 5.47 | 4.5 | α to Hydroxyl. |
| Part. resolved line | 8.10 | 1 ~7.5 | Methylene. |

[1] Intensity obscured due to interference of the solvent spinning side band.

Further, the intensity of the hydrogens α to —OH is one-half that of the aromatic hydrogens, which is consistent with the diol structure.

The presence of but one band in the hydrogen α to OH region establishes the equivalency of the two hydroxyl groups. That is, the hydroxyl groups are either *axial-axial* or *equatorial-equatorial*, not equatorial-axial. If the two tertiary hydrogens occupied nonequivalent positions, two bands would be observed. These data establish that the two hydroxyl groups are trans with respect to each other.

Example II

A 17.2-gram portion of 2-methyl-1,4-naphthoquinone in 150 ml. absolute ethanol was hydrogenated at 3,000 p.s.i. and 150° C. for 4 hours in the presence of copper chromite. After the bomb was vented and the catalyst was removed by filtration, the resulting solution was clear and nearly colorless in contrast to the purple solutions obtained on reduction of 1,4-naphthoquinone. Three products were formed with a conversion of 96.2% as determined by gas chromatograph. The products were separated by distilling the ethanol, leaving an oil. Two crystalline solids precipitated on addition of petroleum ether to the oil. One of these solids was 1,4-dihydroxy-2-methyl-1,2,3,4-tetrahydronaphthalene which, on recrystallization, was in the form of colorless platelets having a melting point of 183.5–184° C. The other precipitate was ac-1-hydroxy-3-methyl-1,2,3,4-tetrahydronaphthalene in the form of colorless needles having a melting point of 116.2–116.7° C. The remaining petroleum ether was distilled to recover additional 3-methyl-1-hydroxy-1,2,3,4-tetrahydronaphthalene and trans-1-hydroxy-2-methyl-1,2,3,4-tetrahydronaphthalene which, after recrystallation, had a melting point of 70.0–70.8° C.

Example III

When the process of Example II was run at a temperature of 125–150° C., the product was the diol.

Now having described my invention, what I claim is:

1. The process comprising reacting with hydrogen a compound having at least one terminal 1,4-quinoid ring fused to an aromatic ring in the presence of catalytic amounts of copper chromite and at temperatures and hydrogen pressures effective to reduce at least one said quinoid ring to produce a nonketo compound selected from the group consisting of mono- and polyhydric alcohols, wherein the temperature is from about 125° C. to about 200° C., the hydrogen pressure is in excess of about 500 p.s.i.g. and the reaction is carried out for a period of time ranging from about 1 to about 8 hours.

2. The process of claim 1 wherein the temperature is within the range of 135–175° C.

3. The process of claim 1 wherein said compound having at least one terminal 1,4-quinoid ring fused to an aromatic ring is in solution in a solvent which is inert to the reactants under reaction conditions.

4. The process of claim 3 wherein the process is carried out in the presence of 5.0–21.5 grams copper chromite per mole of quinone.

5. The process of claim 3 wherein the process is carried out at 135–175° C., at hydrogen pressures of 3,000–5,000 p.s.i., and in the presence of 10–30 grams of copper chromite per mole of quinone.

6. The process comprising contacting a solution of 2-methyl-1,4-naphthoquinone in a solvent which is inert to the reactants under reaction conditions, with hydrogen at superatmospheric hydrogen pressure, and in the presence of catalytically effective amounts of copper chromite and forming a 1,4-dihydroxy-1,2,3,4-tetrahydronaphthalene or a monohydroxy nonketonic 1,2,3,4-tetrahydronaphthalene wherein the reaction temperature is from about 125° C. to about 200° C., the hydrogen pressure is in excess of about 500 p.s.i.g. and the reaction is carried out for a period of time ranging from about 1 to about 8 hours.

7. The process of claim 6 wherein the hydrogen pressure is on the order of 1,000–5,000 p.s.i.

8. The process for the preparation of glycols from 1,4-quinones comprising reacting hydrogen with a quinone having at least one p-quinone ring terminally fused to an aromatic ring in the presence of catalytically effective amounts of copper chromite, at predetermined temperatures effective to reduce two quinone carbonyls to the corresponding glycol, and at hydrogen pressures effective to facilitate the reduction of the two carbonyls to the corresponding glycol wherein the reaction temperature is from about 125° C. to about 200° C., the hydrogen pressure is in excess of about 500 p.s.i.g. and the reaction is carried out for a period of time ranging from about 1 to about 8 hours.

9. The process for the preparation of nonquinoid monoalcohols from 1,4-quinones comprising reacting hydrogen with a quinone having at least one p-quinone ring terminally fused to an aromatic ring in the presence of catalytically effective amounts of copper chromite, at predetermined temperatures effective to reduce one quinone carbonyl to the corresponding monoalcohol, and at hydrogen pressures effective to facilitate the reduction of the carbonyl to the corresponding monoalcohol wherein the reaction temperature is from about 125° C. to about 200° C., the hydrogen pressure is in excess of about 500 p.s.i.g. and the reaction is carried out for a period of time ranging from about 1 to about 8 hours.

10. The process comprising reducing of 1,4-anthroquinone in solution in a solvent which is inert to the reactants under reaction conditions with hydrogen at superatmospheric hydrogen pressures, and in the presence of catalytically effective amounts of copper chromite wherein the reaction temperature is from about 125° C. to about 200° C., the hydrogen pressure is in excess of about 500 p.s.i.g. and the reaction is carried out for a period of time ranging from about 1 to about 8 hours.

11. The process comprising reducing of 1,4-phenanthroquinone in solution in a solvent which is inert to the reactants under reaction conditions with hydrogen at superatmospheric hydrogen pressures, and in the presence of catalytically effective amounts of copper chromite wherein the reaction temperature is from about 125° C. to about 200° C.. the hydrogen pressure is in excess of about 500 p.s.i.g. and the reaction is carried out for a period of time ranging from about 1 to about 8 hours.

12. The process comprising reducing of 1,4-naphthoquinone substituted by at least one hydrocarbon moiety having 1–3 carbon atoms in a solvent which is inert to the reactants under reaction conditions with hydrogen at superatmospheric hydrogen pressures, and in the presence of catalytically effective amounts of copper chromite wherein the reaction temperature is from about 125° C. to about 200° C., the hydrogen pressure is in excess of about 500 p.s.i.g. and the reaction is carried out for a period of time ranging from about 1 to about 8 hours.

13. The process for the preparation of 2-methyl-1,4-dihydroxy-1,2,3,4-tetrahydronaphthoquinone comprising reacting 2-methyl-1,4-naphthoquinone with hydrogen under 3,000–5,000 p.s.i. hydrogen pressure in the presence of at least 5 grams of copper chromite per mole of naphthoquinone per mole of 2-methyl-1,4-naphthoquinone and at temperatures of about 125–175° C. for a period of time ranging from about 1 to about 8 hours.

14. The process comprising contacting 2-methyl-1,4-naphthoquinone with hydrogen at 3,000–5,000 p.s.i. hydrogen pressure in the presence of at least about 5 grams copper chromite per mole of 2-methyl-1,4-naphthoquinone and at temperatures of 50–200° C. for a period of time ranging from about 1 to about 8 hours to form a monohydroxy-2-methyl-1,2,3,4-tetrahydronaphthalenes wherein the hydroxy group is in the 1- or 4-position.

References Cited

UNITED STATES PATENTS

| 2,137,407 | 11/1938 | Lazier | 260—618 X |
| 2,400,959 | 5/1946 | Stewart | 260—618 X |
| 2,087,691 | 7/7937 | Lazier. | |

OTHER REFERENCES

Boyland et al., J. Chem. Soc., 1951, pp. 1837–40.

Boyland et al., Chem. Abstracts, vol. 54, p. 24903b (1960).

Laschtuvka et al., Chem. Abstracts, vol. 54, p. 22679e (1960).

Lipage, Bull. Soc. Chim., France, 1963 (10), pp. 2019–22.

Sawa et al., Chem. Abstracts, vol. 51, pp. 5026-7d (1957).

LEON ZITVER, *Primary Examiner.*

T. G. DILLAHUNTY, *Assistant Examiner.*